United States Patent [19]

Schäfer

[11] Patent Number: 4,501,456
[45] Date of Patent: Feb. 26, 1985

[54] STORAGE RACK WITH MULTIPLE DRAWER COMPARTMENTS AND MOLD FOR MAKING SAME

[75] Inventor: Gerhard Schäfer, Neunkirchen, Fed. Rep. of Germany

[73] Assignee: Fritz Schäfer Gesellschaft Mit Beschränkterhaftung, Neunkirchen, Fed. Rep. of Germany

[21] Appl. No.: 362,083

[22] Filed: Mar. 26, 1982

[30] Foreign Application Priority Data

Mar. 31, 1981 [DE] Fed. Rep. of Germany ... 8105516[U]

[51] Int. Cl.³ ............................................. A47B 88/06
[52] U.S. Cl. .................................. 312/273; 312/286; 312/330 R; 312/323; 312/348
[58] Field of Search ............... 312/243, 269, DIG. 33, 312/284, 326, 274, 275, 330, 286, 287, 322, 323, 348, 350, 273

[56] References Cited

U.S. PATENT DOCUMENTS

| | | | |
|---|---|---|---|
| 1,653,530 | 12/1927 | Abrachinsky | 312/286 |
| 1,742,333 | 1/1930 | Walter | 312/326 X |
| 1,987,448 | 1/1935 | Pearson | 312/DIG. 33 |
| 2,534,100 | 12/1950 | Baumgartner | 312/348 |
| 4,155,611 | 5/1979 | Brekke et al. | 312/348 |
| 4,291,804 | 9/1981 | Weidt | 206/509 |

FOREIGN PATENT DOCUMENTS

| | | | |
|---|---|---|---|
| 561447 | 4/1957 | Italy | 312/348 |
| 22352 | 10/1901 | Switzerland | 312/274 |

Primary Examiner—William E. Lyddane
Assistant Examiner—Joseph Falk
Attorney, Agent, or Firm—Karl F. Ross; Herbert Dubno

[57] ABSTRACT

A rack designed to accommodate several tiers of drawers has a frame spanned by one or more shelves defining a plurality of storage levels each partitioned by at least one upright divider into a plurality of compartments disposed side by side, each compartment having a wide-open front end and a rear end which may be partly obstructed by a low sill allowing an inserted drawer to be rearwardly extracted on being lifted above that sill. A profiled web in an upper zone of the front end of each compartment, projecting from above with a height slightly exceeding that of the sill, coacts with an upper rear flange of the respective drawer to prevent its forward extraction by a sliding motion through enabling such extraction by an upward tilting of the drawer; that web also lets the drawer hang out of its compartment with a slight downward tilt in a forward position. The top of the frame is concave to serve as an open ancillary receptacle. Also disclosed is a mold for making such a rack from plastic material, the mold comprising a split shell conforming to the frame and two oppositely displaceable interfitting cores defining cavities corresponding to the shelves, dividers, sills and webs.

17 Claims, 13 Drawing Figures

STORAGE RACK WITH MULTIPLE DRAWER COMPARTMENTS AND MOLD FOR MAKING SAME

FIELD OF THE INVENTION

My present invention relates to a storage rack, of the type accommodating a multiplicity of drawers in respective compartments, as well as to a mold for producing such a rack from polymeric material.

BACKGROUND OF THE INVENTION

Commonly owned U.S. Pat. No. 4,291,804 (Weidt) discloses a stackable container for the storage and/or transportation of documents or other articles, this container comprising an open-topped box with an access opening in front which may be obstructed by a removable closure plate. The access opening is flanked by corner profiles which are integral with a handgrip and have lower portions forming guide grooves for the insertion of the closure plate.

OBJECTS OF THE INVENTION

The general object of my present invention is to provide a compartmented rack designed to accommodate slidable drawers similar to the containers described in the above-identified patent.

A more particular object is to provide means in such a rack for enabling an extraction of any drawer at either a front end or a rear end of the respective compartment while stabilizing that drawer in a fully inserted position. Especially with drawers designed for the storage of screws, nails, findings or other small articles, the compartments should also facilitate the tilting of the respective drawers in a forward position to make their contents readily accessible.

SUMMARY OF THE INVENTION

A rack according to my invention comprises a frame, preferably molded integral from synthetic resin, having a base, a pair of sidewalls and a roof which define a space of rectangular vertical outline divided by partition means into a plurality of compartments accommodating respective drawers. A sill or backstep at a rear end of each compartment may define an insertion position for the corresponding drawer while preferably enabling same to be extracted through a rear end upon being lifted above the sill. A stop member, advantageously in the form of a resilient web with a rearwardly bent profile, depends from above into a front end of each compartment over a height exceeding that of the sill for engagement with a back wall of the respective drawer in a forward position of the latter while enabling an extraction of the drawer through the front end by a tilting motion about a free edge of this stop member.

According to another feature of my invention, the roof of the rack is trough-shaped and forms an additional storage space which could be used for articles different from and possibly larger than those contained in the drawers, e.g. tools such as wrenches, hammers or screwdrivers.

The rack according to my invention can be produced in a mold comprising a shell which conforms to the frame and two oppositely displaceable interfitting cores defining cavities that correspond to the internal frame structure including the sills and webs as well as shelves and upright dividers constituting the partition means. When the frame of the rack has external ribs and depressions, such as the ancillary receptacle formed by its concave roof, the shell will have to be split into at least two parts that must be separated for removal of the molded frame.

BRIEF DESCRIPTION OF THE DRAWING

The above and other features of my invention will now be described in detail with reference to the accompanying drawing in which.

SPECIFIC DESCRIPTION

Figure 1:
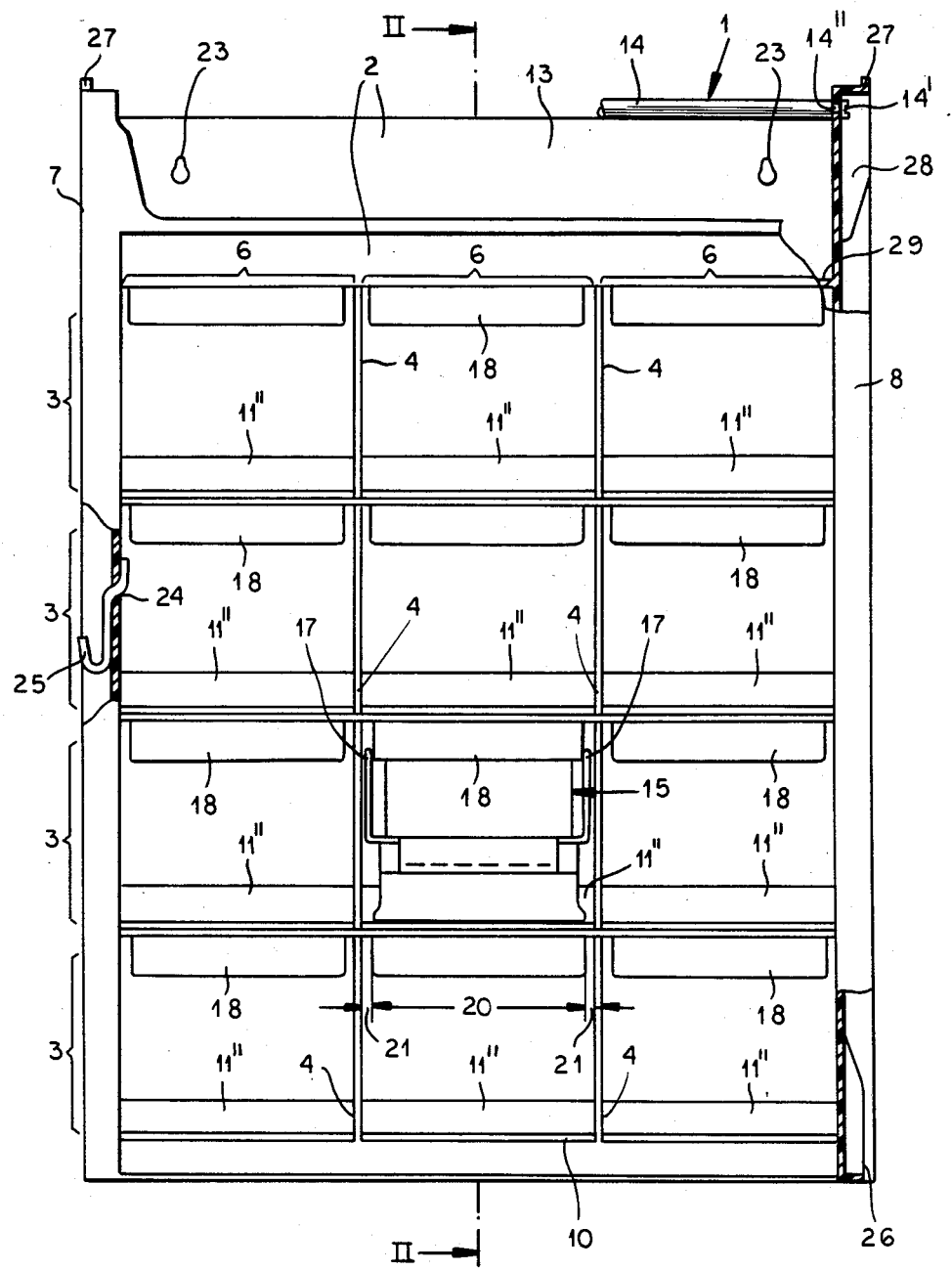
FIG. 1 is a front view (parts broken away) of a storage rack according to my invention with four tiers of three compartments each to accommodate respective drawers, only one such drawer being illustrated.
Figure 2:
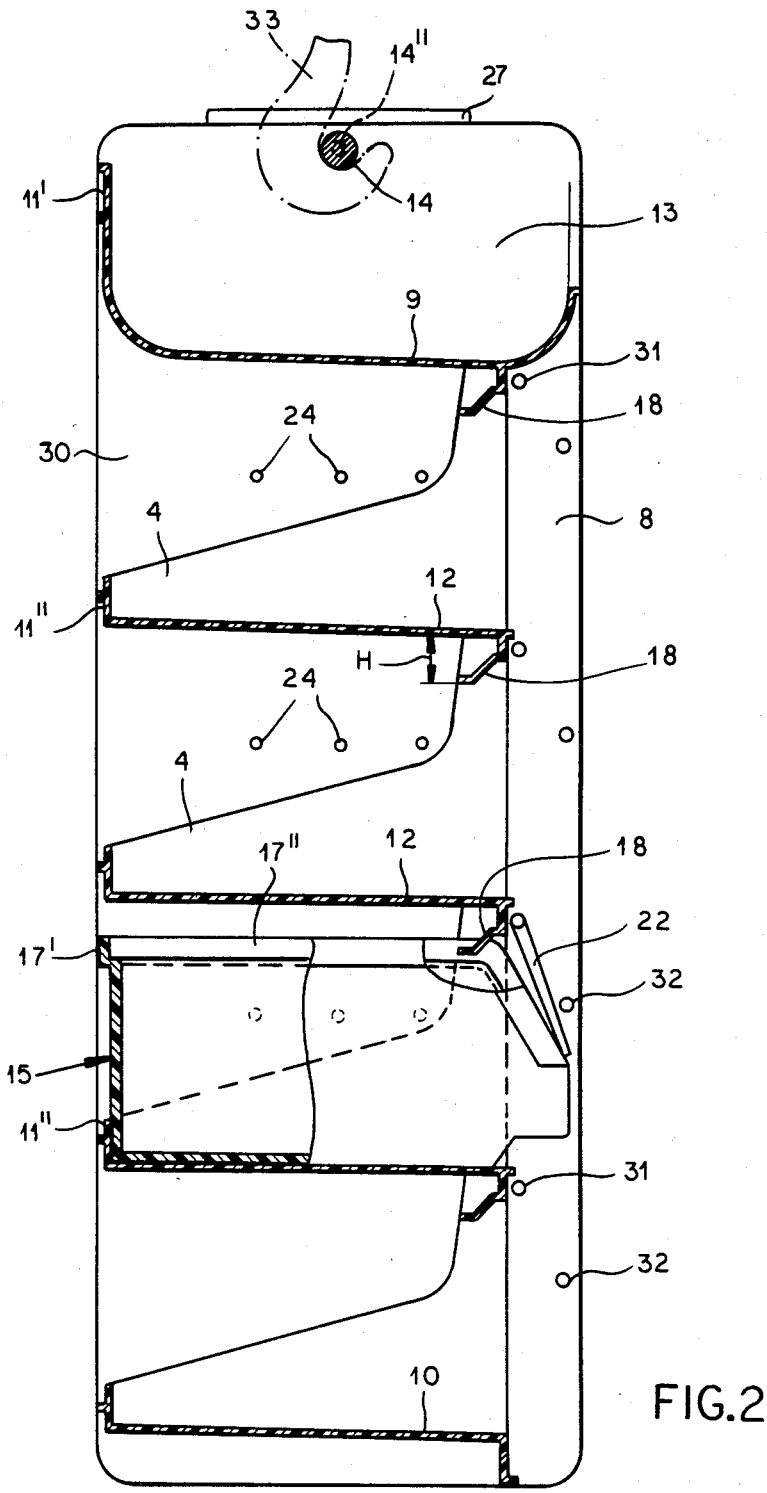
FIG. 2 is a cross-sectional view through the rack and part of the illustrated drawer, taken substantially on the line II—II of FIG. 1.
Figure 3:
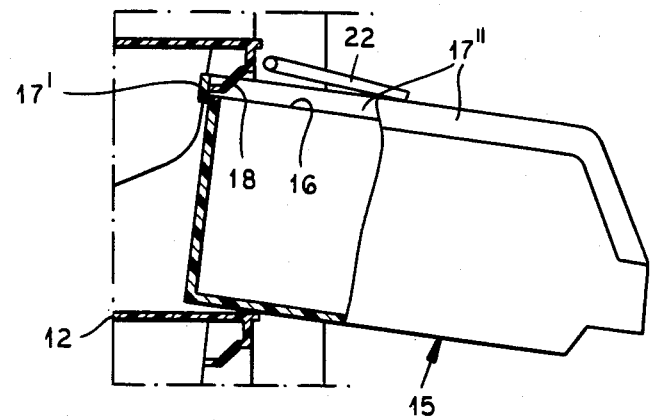
FIG. 3 is a fragmentary sectional view of the rack, showing the drawer in a downwardly tilted forward position.

A storage rack 1 according to my invention, as illustrated in FIGS. 1–3, comprises a unitary frame 2 whose interior is partitioned by horizontal shelves 12 and vertical dividers 4 into four tiers 3 each forming three compartments 6 side by side. The frame 2 has a base 10, a pair of sidewalls 7, 8 and a roof 9 which, as best seen in FIG. 2, is upwardly concave to form a trough 13 serving as an ancillary receptacle. A rod 14, overlying the trough 13, is secured to the sidewalls by screws 14' (only one shown) passing through holes 14"; this rod serves as a handle by which the rack may be suspended from hooks 33 as indicated in phantom lines in FIG. 2. A rear wall 11' of trough 13 may be provided with keyhole-shaped openings 23 whereby the rack could also be suspended with the aid of headed fasteners such as screws or nails projecting from an upright support.

Each compartment of rack 1 is wide open at a rear end 30 as well as at an opposite front end thereof, these ends being obstructed only to a minor extent by an upstanding sill 11" (in line with trough wall 11') at the rear and a depending web 18 at the front. A drawer 15 insertable into any compartment, substantially corresponding to the stackable container disclosed in the above-identified Weidt patent, has a top ledge 16 of U-shaped horizontal outline bounded by a marginal ridge 17 with a rear section 17' and lateral sections 17" whose forward extensions bracket an access opening which can be closed by the insertion of a glass plate and which allows the contents of the drawer to be viewed even in the fully inserted position illustrated in FIG. 2. The height of each compartment exceeds that of drawer 15 by more than the height of the sills 11" in order that the drawer may be lifted above the corresponding sill for rearward extraction. Each web 18, which closely fits between the lateral sections of ridge 17 as seen in FIG. 1, has a height somewhat greater than that of the sills in order to let the free edge of the web intercept the rear ridge section 17' when the drawer is pulled forward as seen in FIG. 3. In that forward position the drawer tends to tilt downward until the web edge comes to rest on the ledge 16. If it is desired to extract the drawer through the front end of its compartment, an upward tilting of the drawer (counterclockwise in FIG. 3) will let the rear bottom edge of the drawer clear the compartment floor to permit the disengagement of ridge 17' from web 18. The webs, which together with the sills 11" and the partitions 4, 12 are preferably molded integral with frame 2 of thermoplastic or thermosetting polymeric material, have a rearwardly bent profile and are thin enough to be elastically deformable when the drawer is reinserted by a sliding motion. The height of the webs may be about three times that of the ridges 17', 17"

In order to protect a row of drawers from unauthorized frontal access, a flap 22 may be hinged in front of each tier to the sidewalls 7, 8 with the aid of holes 31 and may be retained in position by locking bars, padlocks or the like passed through other holes 32 in these sidewalls. Further holes 24 can be used for the suspension of wire hooks 25 designed to support tools or other accessories.

As best seen in FIG. 2, each divider 4 extends over the full height of the adjoining compartments at the front of the frame but rises only to the top level of their sills 11" at the rear. Between these two levels the dividers, which also have a reinforcing function, are bounded by curvilinear upper edges which simplify their molding in the assembly described hereinafter with reference to FIGS. 12 and 13.

Figure 4:
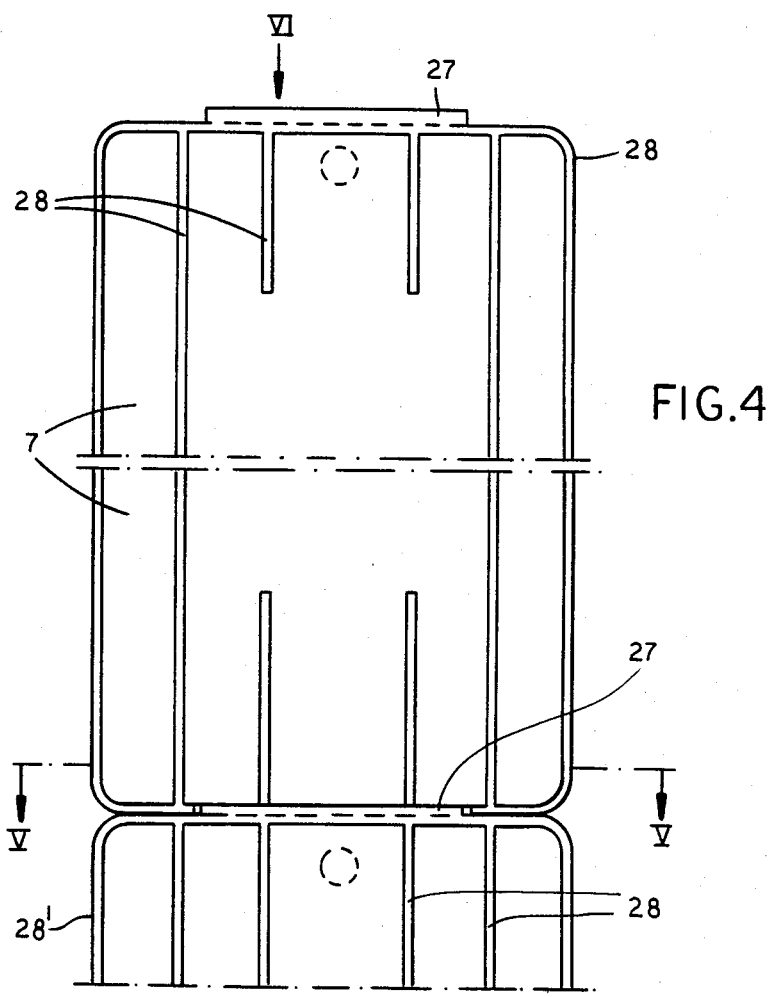
FIG. 4 is a side-elevational view, partly broken away, of the rack of FIGS. 1–3 stacked upon a similar rack shown only in part.
Figure 5:
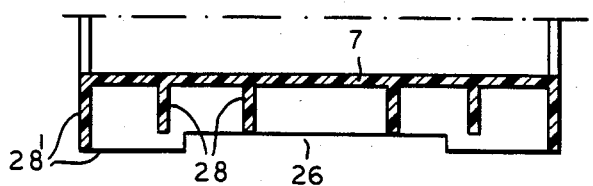
FIG. 5 is a fragmentary cross-sectional view taken on the line V—V of FIG. 4, mainly showing one of the sidewalls of the rack.
Figure 6:
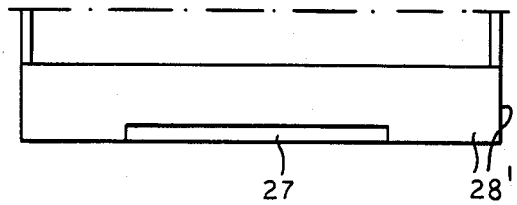
FIG. 6 is a top view of the same sidewall and adjoining parts of the rack.
Figure 7:
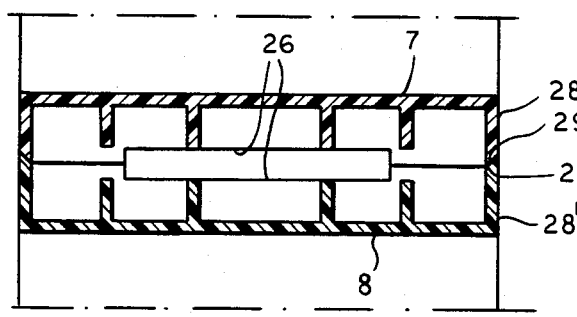
FIG. 7 is a fragmentary sectional view similar to that of FIG. 5 but showing two juxtaposed racks with interfitted sidewall formations.

The two sidewalls 7 and 8 are advantageously provided on their outer surfaces with reinforcing ribs 28 recessed within respective peripheral flanges 28'. In order to enable the stacking of several racks 1, as illustrated in FIG. 4, the peripheral flanges 28' are preferably provided with mutually complementary lower and upper formations such as incisions 26 and tongues 27 (see also FIGS. 5 and 6) which interfit on the superposed racks. It may also be desirable to provide the flanges of these two sidewalls with mutually complementary edge formations, such as oppositely beveled flanks 29' and 29" shown in FIG. 7, designed to keep two closely juxtaposed racks aligned with each other and to prevent their relative shifting. A multiplicity of such racks may therefore be assembled both horizontally and vertically into a large storage cabinet.

Figure 8:
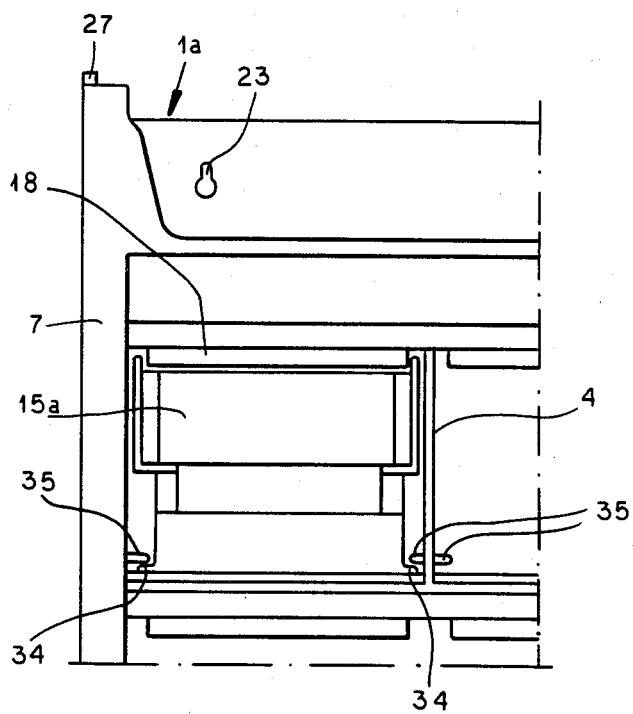
FIG. 8 is a fragmentary front view of a rack according to my invention having a slighly modified internal structure.

In FIG. 8 I have shown a slightly modified rack 1a whose compartments are designed to accommodate drawers 15a provided with lateral bottom ledges 34. Strips 35 project slightly above the floor of each compartment on sidewalls 7, 8 and dividers 4 so as to overlie the ledges 34 for a more positive guidance of the drawer. In this instance the sills 11" have been omitted to enable a rearward extraction of such a drawer; these sills could, however, be provided as backstops also in the present instance if such extraction is not contemplated.

Figure 9:
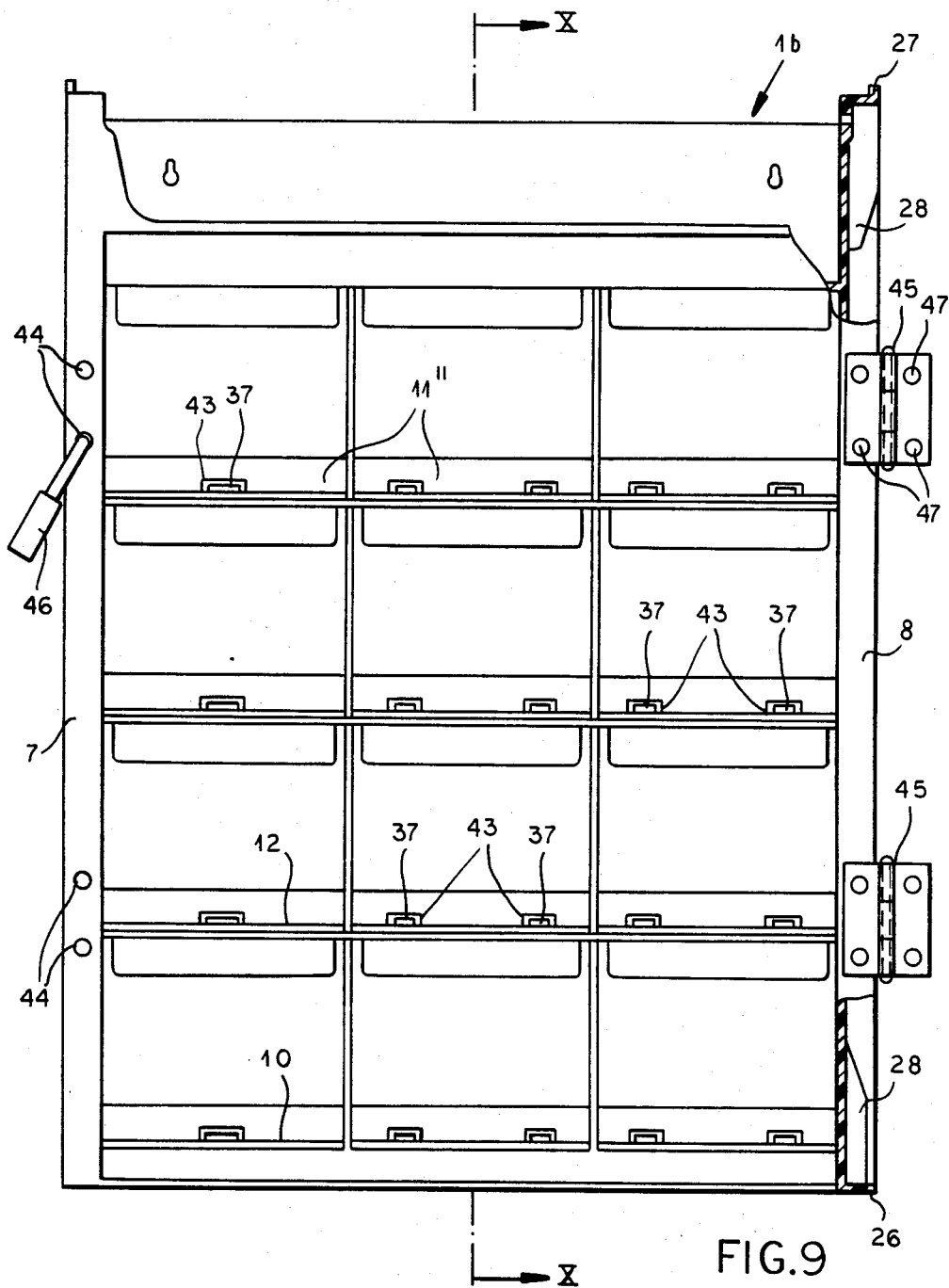
FIG. 9 is a front-elevational view similar to that of FIG. 1 but showing another modification.
Figure 10:
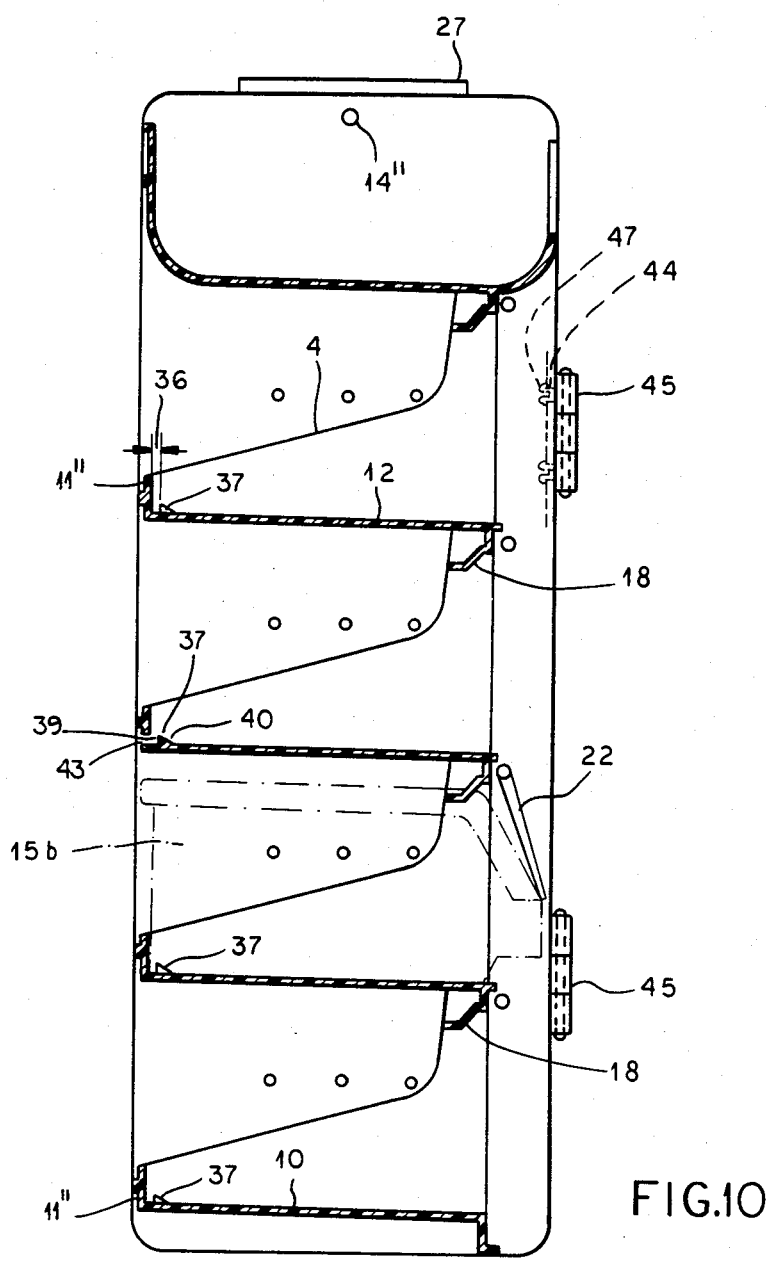
FIG. 10 is a cross-sectional view taken on the line X—X of FIG. 9.
Figure 11:
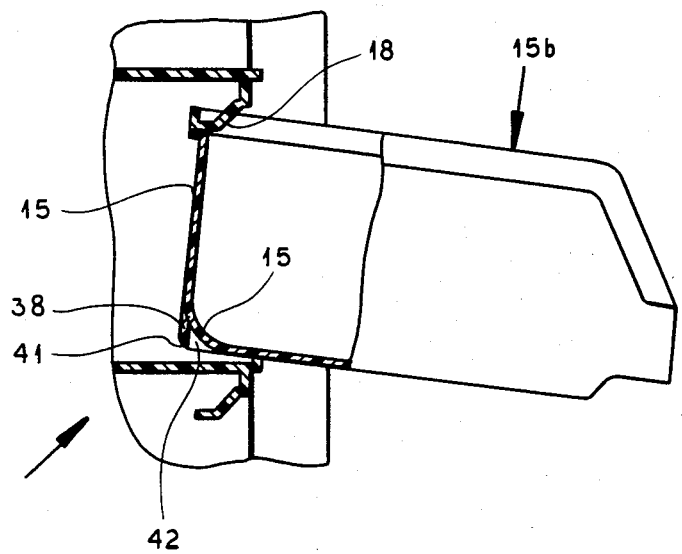
FIG. 11 is a fragmentary sectional view similar to that of FIG. 3 but relating to the modification of FIGS. 9 and 10.

Another modified rack 1b according to my invention, shown in FIGS. 9–11, is provided at the rear end of each compartment—just ahead of sill 11"—with one or two bosses 37 of triangular profile having a steep rear surface 39 and a sloping ramp surface 40 facing the front end, these bosses rising to a level well below the top of the sills 11" and being separated from these sills by a gap 36 accommodating a downward projection 38 at the rear of a modified drawer 15b (FIG. 11). The lower edge of projection 38 is rounded at 41 to facilitate its sliding over ramp face 40 when the drawer is pushed back into its insertion position. Projection 38 is the rear wall of a bottom groove 42 of drawer 15b and preferably extends over substantially the full width of that drawer; bosses 37, on the other hand, are of considerably more limited width. Each boss, moreover, is aligned with a respective aperture 43 in the associated sill 11" for molding purposes as will become clearer from the description of FIG. 12.

In FIG. 9 I have also shown the flanges of sidewalls 7 and 8 provided with additional openings 44 accommodating external attachments, e.g. hinges 45 with split studs 47 traversing these openings. Such hinges could be used to interconnect two juxtaposed racks and to allow them to be swung into a confronting position in which they can be retained by a padlock 46 traversing openings 44 in the flanges of the remaining sidewalls; this will make the front ends of their compartments inaccessible. In this instance it may be desirable to make the sills 11" higher than illustrated in FIGS. 2 and 10, so as to prevent the rearward extraction of a drawer, as long as the top of the sills does not reach the level of the lower edges of the corresponding webs 18 in order to enable a molding of the rack by an assembly such as that about to be described.

Figure 12:
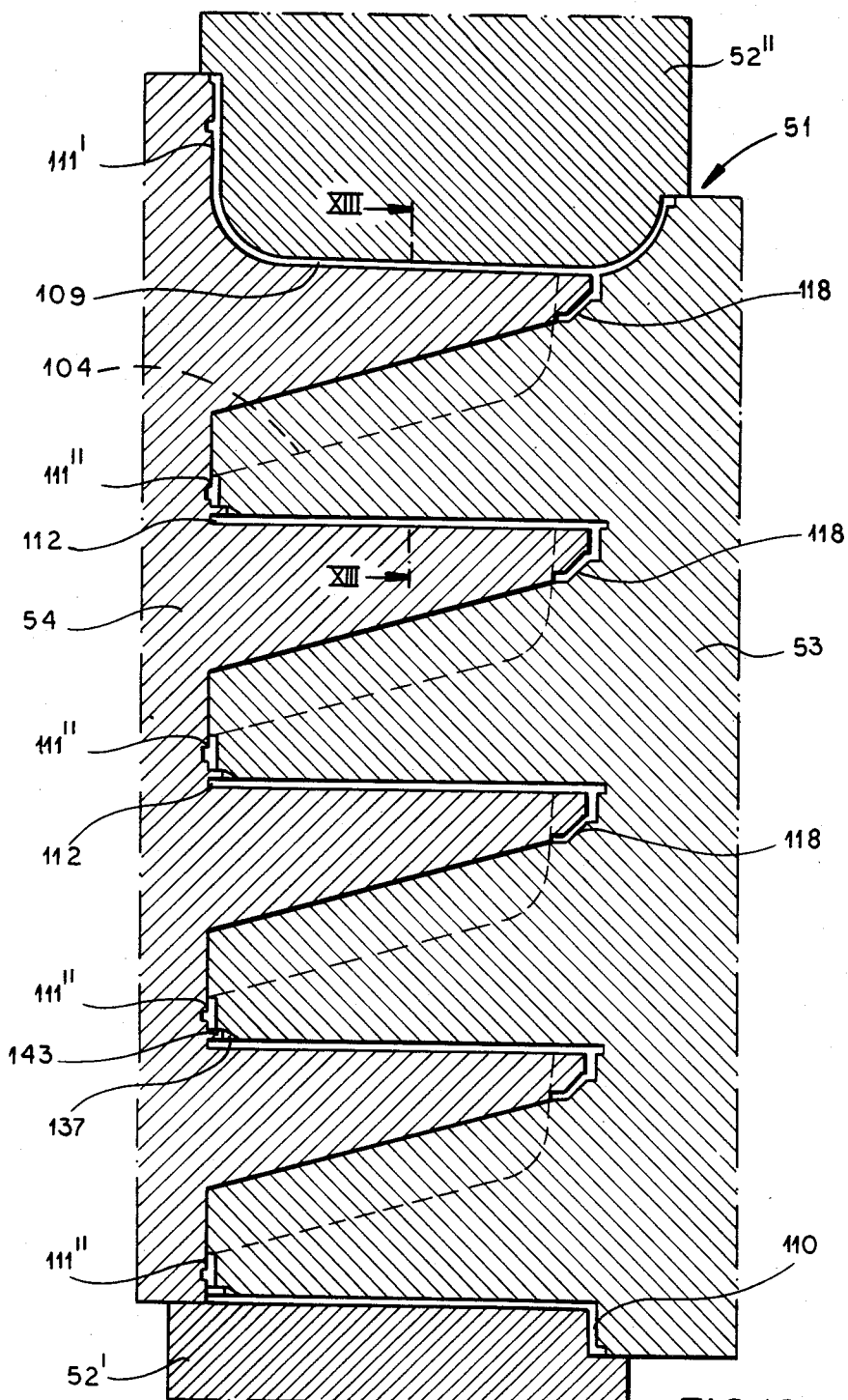
FIG. 12 is a sectional elevational view of a multipart mold for the manufacture of a rack incorporating the elements of FIGS. 9–11.

In FIG. 12 I have illustrated a mold 51 suitable for the integral casting of rack 1b of FIGS. 9–11 by injection or compression. The mold comprises a split shell or female member with parts 52', 52" which define the outer contour of the frame, including the reinforcing ribs of its sidewalls, and can be separated in a vertical direction. Two male members or cores 53, 54 are insertable into that shell from opposite sides and have generally sawtooth-shaped projections of complementary shape which, in the assembled position of FIG. 12, define gaps or cavities with each other and with the shell which have been identified by the same reference numbers as the parts to be molded therein with addition of a "1" in the position of the hundreds digit. Thus, a cavity 109 and an extension 111' thereof will form the roof 9 and the receptacle wall 11' while another cavity 110 will form the bottom 10 of the frame. Several cavities 112 are provided for the shelves 12 and communicate with cavities 104 (see also FIG. 13) serving to form the dividers. The latter cavities, as well as those designed to form the sidewalls, communicate with gaps 111" for the formation of the sills 11". Similar gaps 118 extend from cavities 109 and 112 to form the webs 18. Mold core 54 is further provided with short horizontal ribs 143 designed to form the apertures 43 and to coact with confronting edges of mold core 53 for defining gaps 137 extending from cavities 110 and 112 to create the bosses 37. Gaps 111″ could, in principle, extend over the full height of the end faces of the projections of core 53 if the height of the sills is not critical.

Figure 13:
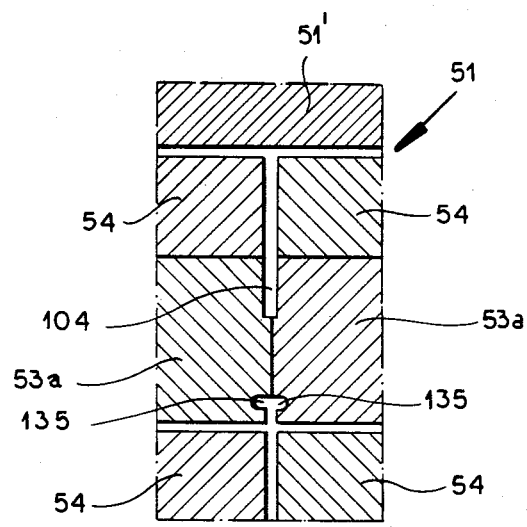
FIG. 13 is a fragmentary sectional view through the mold of FIG. 12, taken on line XIII—XIII thereof, with a modification relating to the rack of FIG. 8.

From FIG. 13 it will be apparent that the two mutually complementary cores are not unitary structures but are split along vertical planes into identically shaped sections which may be bolted to one another to operate as a unit. In FIG. 13, furthermore, core 53 has been replaced by a modified core 53a with channels 135 designed to form the lateral strips 35 of FIG. 8. If the rack formed with these strips is to have no sills 11″, the gaps 111″ of FIG. 12 will also be omitted.

The rounded contour of dividers 4, reflected in the shape of the corresponding cavities 104, makes it easier to separate the finished workpiece from the mold cores. Such separation can be further facilitated by providing the nominally parallel cavity walls with slight drafts as is conventional in the molding art.

I claim:

1. A storage rack comprising:
   a frame having a base, a pair of sidewalls and a roof defining a space of rectangular vertical outline;
   partition means in said frame dividing said space into a plurality of compartments;
   a plurality of drawers each slidably received in one of said compartments, said drawers having a height less than that of the respective compartments and being each provided with a rear wall having an upper ledge backed by an upstanding marginal ridge; and
   a stop member depending from the overlying roof into a front end of each compartment for engagement with a back wall of the respective drawer in a forward position of the latter while enabling an extraction thereof through said front end by a tilting motion about a free edge of said stop member, said stop member being a resilient web with a rearwardly slanting profile yielding backward to enable sliding insertion of a drawer into the respective compartment from said front end but resisting extraction of an inserted drawer through said front end by coming to rest against said ridge and said ledge, the rear end of each compartment being provided with a sill defining stop means for establishing an insertion position for the respective drawer while enabling the respective drawer to be extracted through said rear end upon being lifted above said sill, each compartment having a floor provided near the rear end thereof but forwardly of its sill with a boss of a lesser height than said sill engageable with a downward projection of an inserted drawer for preventing a forward sliding thereof from said insertion position.

2. A rack as defined in claim 1 wherein said stop member extends over a height exceeding that of said sill.

3. A rack as defined in claim 1 or 2 wherein each of said ridge has lateral forward extensions bracketing an access opening of the drawer, said stop member fitting closely between said forward extensions.

4. A rack as defined in claim 3 wherein said compartments are provided with flaps hinged to said sidewalls and positioned to overhang the access openings of inserted drawers, said flaps being lockable in a closure position for preventing the extraction of the respective drawers through said front end.

5. A rack as defined in claim 1 wherein each compartment is provided slightly above a floor level thereof with a pair of oppositely extending lateral strips engageable with lateral bottom ledges of the respective drawer.

6. A rack as defined in claim 1 wherein said boss is ramp-shaped for facilitating a rearward sliding of said projection thereover upon displacement of the drawer into said insertion position.

7. A rack as defined in claim 6 wherein said sill has an aperture in line with said boss.

8. A rack as defined in claim 1 or 2 wherein said roof is trough-shaped and forms an additional storage space.

9. A rack as defined in claim 8 wherein said additional storage space is overlain by a handle spanning said sidewalls above said top.

10. A rack as defined in claim 1 or 2 wherein each of said sidewalls has a peripheral flange provided with mutually complementary upper and lower formations facilitating the stacking of several such racks.

11. A rack as defined in claim 1 or 2 wherein said sidewalls have mutually complementary edge formations preventing a relative shifting of closely juxtaposed racks.

12. A rack as defined in claim 10 wherein said flanges are further provided with openings accommodating external attachments.

13. A rack as defined in claim 1 or 2 wherein said partition means includes upright dividers between adjacent compartments extending over the full height of said compartments at said front end but rising only to the top level of the respective sills at said rear end.

14. A rack as defined in claim 1 or 2 wherein said frame, partition means, sills and stop members are part of an integrally molded body of synthetic resin.

15. A storage rack comprising:
    a frame having a base, a pair of sidewalls and a roof defining a space of rectangular vertical outline;
    partition means in said frame dividing said space into a plurality of compartments;
    a plurality of drawers each slidably received in one of said compartments, said drawers having a height less than that of the respective compartments; and
    a stop member depending from the overlying roof into a front end of each compartment for engagement with a back wall of the respective drawer in a forward position of the latter while enabling an extraction thereof through said front end by a tilting motion about a free edge of said stop member, the rear end of each compartment being provided with a sill defining stop means for establishing an insertion position for the respective drawer while enabling the respective drawer to be extracted through said rear end upon being lifted above said sill, each compartment having a floor provided near the rear end thereof but forwardly of its sill with a boss of a lesser height than said sill engageable with a downward projection of an inserted drawer for preventing a forward sliding thereof from said insertion position, said projection being receivable in a gap between said boss and said sill.

16. A rack as defined in claim 15 wherein said boss is ramp-shaped for facilitating a rearward sliding of said projection thereover before dropping into said gap upon displacement of the drawer into said insertion position.

17. A rack as defined in claim 15 or 16 wherein said sill has an aperture in line with said boss and in communication with said gap.

* * * * *